United States Patent [19]
Mercer et al.

[11] Patent Number: 5,832,589
[45] Date of Patent: Nov. 10, 1998

[54] METHOD OF ATTACHING A FUEL LINE TO A FUEL FILTER

[75] Inventors: Larry R. Mercer; Anthony W. Usalis, Jr., both of Fayetteville, N.C.; David G. Albers, Jr., Tulsa, Okla.; James S. Jackson, Fayetteville, N.C.

[73] Assignee: Purolator Products NA, Inc., Tulsa, Okla.

[21] Appl. No.: 870,111

[22] Filed: Jun. 5, 1997

Related U.S. Application Data

[62] Division of Ser. No. 358,699, Dec. 19, 1994, Pat. No. 5,658,023.

[51] Int. Cl.⁶ ..................................................... B23P 11/00
[52] U.S. Cl. ........................................ 29/525.02; 210/232
[58] Field of Search ............................ 29/525.01, 525.02, 29/525.03, 525.04; 285/184, 185; 210/232, 435, 446

[56] References Cited

U.S. PATENT DOCUMENTS 4,861,474  8/1989  Kroha ...................................... 210/232

*Primary Examiner*—Matthew O. Savage
*Attorney, Agent, or Firm*—Joseph V. Tassone

[57] ABSTRACT

A method of attaching a fuel line to a fuel filter is disclosed herein. The method includes the steps of providing a tubular coupling base having first and second ends, affixing the first end to a filter, forming an intermediate portion providing wrench flats on the coupling base, connecting the second end of the coupling base with a fuel line, forming an annular surface on the coupling base between the wrench flats and the second end with a shoulder surface thereon, forming an annular reduced diameter groove on the coupling base between the annular surface and the second end, forming a bracket having a first portion with opposed parallel first and second planar surfaces and a second portion extending perpendicularly to the first portion, forming a circular opening extending through the first and second planar surfaces for receiving the annular surface, engaging the first planar surface with the shoulder surface, removably positioning a retaining ring in the groove of the coupling base to engage the second planar surface of the bracket to secure the bracket to the coupling base, providing protrusions on the first planar surface of the bracket, and providing at least one indentation on the shoulder surface of the coupling base for receiving at least one of the protrusions.

4 Claims, 3 Drawing Sheets

METHOD OF ATTACHING A FUEL LINE TO A FUEL FILTER

CROSS-REFERENCE TO RELATED APPLICATIONS

This is a division of application Ser. No. 08/358,699, filed Dec. 19, 1994, now U.S. Pat. No. 5,658,023.

CROSS-REFERENCE TO MICROFICHE APPENDIX

This application is not related to any microfiche appendix.

BACKGROUND OF THE INVENTION

A. Field of the Invention

This invention relates to an apparatus for attaching a fuel line to a fuel filter providing a support bracket so that after the fuel line is securely attached to the fuel filter, the support bracket will maintain the fuel line in a preselected orientation.

With the advent of automobiles, trucks, buses, boats, etc. having engines with fuel injection systems, fuel systems have been required to operate at higher fuel pressures than before fuel injection systems became popular. With currently used fuel filters, it is important that the orientation of the fuel line, either incoming, outgoing or both, be carefully oriented with respect to the fuel filter. Some manufacturers provide fuel filters with fixed brackets with pre-establish orientation between the fuel filter and the incoming and outgoing fuel lines. These type of fuel filters work satisfactory except that this arrangement requires a special fuel filter unique to each specifically designed vehicle and requires manufacturers, wholesalers, parts distributors, and so forth to stock a large number of different fuel filter components. To avoid the expense of having a specific design for each specific vehicle; whether automobile, truck, boat, or other internal combustion engine application, others have suggested that systems can be arranged for providing fuel filters with brackets so that the brackets may be oriented as fuel lines are installed to correctly position the orientation of the fuel lines to the fuel filters. In this way, a single fuel filter with adjustable brackets may be employed on a large number of different internal combustion engine applications while providing all of the same benefits that are achieved by fuel filters having fixed brackets limited to only a small number of possible applications.

It is, thus, an object of the present invention to provide a universal connection for attaching a fuel line to a fuel filter with a support bracket having a slot therein that receives the fuel line in an arrangement wherein the support bracket may be selectably oriented with respect to the fuel filter so that upon completion of the installation of a fuel filter and the attachment of fuel lines, the support bracket or support brackets will provide support for correct orientation of the fuel lines.

B. Prior Art

For background reference to previously issued United States Patents relating to the subject matter of this disclosure, see the following:

| U.S. Pat. No. | INVENTOR | TITLE |
| --- | --- | --- |
| 392032 | Jacobson | Coupling For Steam or Other Pipes |
| 409127 | Taggart | Pipe Coupling |
| 1140720 | Simons | Universal Coupling |
| 1884869 | Replogle | Method of Making Pipe Sections |
| 2589136 | Ralston | Apparatus For Water Treatment |
| 3909221 | Bengtsson | Filtering Device |
| 4040964 | Hegyl | Adjustable Container Strainer and Handle |
| 4052307 | Humbert Jr. | Universal Filter Mounting Attachment |
| 4271020 | Van Meter | Valve For Filter Device |
| 4452695 | Schmidt | Full-Flow and By-Pass Filter Conversion System For Internal Combustion Engines |
| 4861474 | Kroba | Fuel Filter Coupling |
| 4933079 | Kroba | Fuel Filter Coupling |

BRIEF SUMMARY OF THE INVENTION

A fuel connection is provided for attaching a fuel line to a fuel filter, the connection including a bracket having a U-shaped slot therein for receiving the fuel line and, after the fuel line is attached to the fuel filter, for supporting the fuel line in its selected orientation relative to the fuel filter. More specifically, the invention provides a connection for attaching a fuel line to a fuel filter in which the fuel filter has a longitudinal axis and the fuel line is extendable away from the fuel filter radially of the longitudinal axis in a selected orientation in which the connection includes a bracket having a U-shaped slot for receiving the fuel line and in which the bracket is affixed to support the fuel line in the correct orientation radially of the filter longitudinal axis after the connection is securely in place.

For this purpose, a tubular coupling base is used having a tubular axis. The coupling base is affixed at the first end to the filter so that the tubular axis is coincident with the filter longitudinal axis. The coupling base has an intermediate portion having an external circumferential surface defined by wrench flats. The end of the coupling opposite the filter (second end) is configured for engagement with a fluid fitting connected with the fuel line.

The coupling base is further defined by an annular surface spaced between the second end and the intermediate portion forming a radially extending shoulder surface area. The annular surface has a reduced diameter compared to the surface having the wrench flat, and the annular surface has a circumferential groove therein.

A support bracket is formed of thin, stiff material, preferably metal. It has a first portion in a first plane having a circumferential opening therethrough to snugly receive the coupling base annular surface. The support bracket has an integral second portion that extends in a second plane generally perpendicular to the first plane. The second portion has a fuel line receiving U-shaped recess. The support bracket first portion has protrusions therein spaced around the opening.

The tubular coupling base is configured to react with the protrusions formed in the support bracket first portion. The protrusions function to interrelate with the coupling base to rotationally secure the bracket to the base after it is secured in position.

A retaining ring is removably positioned in the annular groove to engage the upper surface of the support bracket and hold the support bracket in position so that the protrusions therein interlock with the coupling base. In a preferred embodiment, the coupling base has indentations in the shoulder surface at the apex of the wrench flats which receive the protrusions as a means of interlocking the bracket to the coupling base.

DESCRIPTION OF THE PREFERRED EMBODIMENTS

Figure 1:
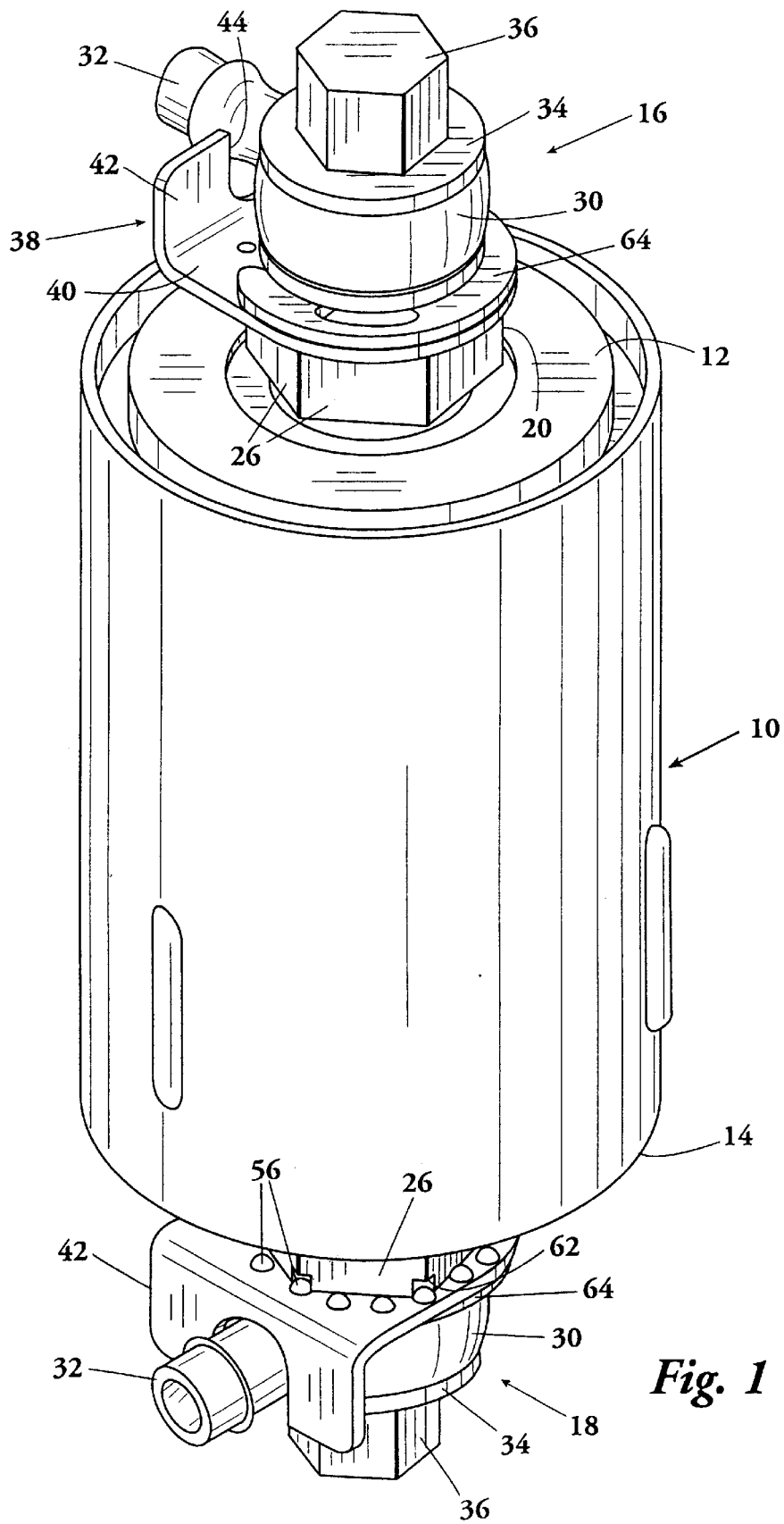
FIG. 1 is an isometric elevational view of a fuel filter having an upper and lower coupling base providing means for receiving the attachment of inlet and outlet fuel lines. Affixed to the coupling base at each end of the filter is a bracket positioned to support incoming and outgoing fuel lines in their selected orientation.

Referring first to FIG. 1, the application of the invention is illustrated. The invention pertains to a connection for attaching fuel lines to fuel filter 10. Filter 10 is of the contained canister type which typically does not employ a removable filter element. Fuel filter 10 has a first end 12 and a second end 14. Attached at first end 12 is a fluid coupling indicated generally by the numeral 16. The drawing illustrates an identical fluid coupling 18 attached to filter lower end 14, however this is by example only as some filters have this kind of connection on only one end. The function of fluid couplings 16, 18 is to provide means of attaching a fuel line to each end of the filter, one being a fuel inlet line and the other a fuel outlet line. In the installation of filter 10 it is normally necessary for the fuel lines to extend in different directions radially from the cylindrical axis of filter 10. The purpose of this invention is to provide an improved fluid coupling 16, 18 so that when a fluid filter 10 is installed in a vehicle, whether automobile, truck, bus, boat, or so forth, the orientation of the fuel lines extending to and from the filter can be arranged as required and the fuel lines securely supported at the point of attachment to the fuel filter. The invention will be described with reference to the upper fuel coupling 16 since the same components are employed in the same way for the lower fuel coupling 18 in the typical fuel filter installation.

A coupling base 20 (shown in detail in FIGS. 2 and 5) has a first end portion 22 (not seen in FIG. 1, best seen in FIGS. 2 and 5) in the form of a reduced diameter annular section for insertion into an aperture (not seen) formed in fluid filter 10. The annular end portion 22 extends longitudinally inwardly along the tubular axis of coupling base 20 to adjoin shoulder 24 (FIG. 5) that is of larger external radius than annular end portion 22 with the end surface 12 of filter 10. Shoulder 24 acts as a stop to effectively limit entry of fluid coupling base 20 into the fluid filter aperture.

Coupling base 20 has an external surface defined in part by wrench flats 26.

Secured to the upper surface 28 of coupling base 20 (See FIG. 1) is a fuel line connection 30 that is shown with an integral tubular extending nipple portion 32 configured to receive the end of a flexible fuel line (not shown), however, not all fuel line connectors have a nipple portion. Fuel line connection 30 is secured to coupling base 20 by means of a washer 34 and bolt 36. The invention herein is not concerned with fuel line connection 30, washer 34 or bolt 36 or fuel filter 10 since these are a standard items of commonly used fuel delivery systems.

When a fuel filter 10 is installed, it is important that the incoming and outgoing fuel lines be supported in their correct orientation relative to the filter in order to reduce the possibility of the fuel lines being disconnected or broken away from the filter. For this reason, a support bracket, generally indicated by the numeral 38, is employed for each fuel line. Support bracket 38 (See FIG. 3) has a first portion 40 that lies in one plane and an integral second portion 42 that is in a plane generally perpendicular to the plane of first portion 40. Second portion 42 has a line receiving recess 44 therein through which nipple portion 32 of fuel line connection 30 extends as seen in FIG. 1. When a fuel line is received on nipple portion 32 it is also received within line receiving recess 44 so that the fuel line is thus supported by bracket 40.

Figure 2:
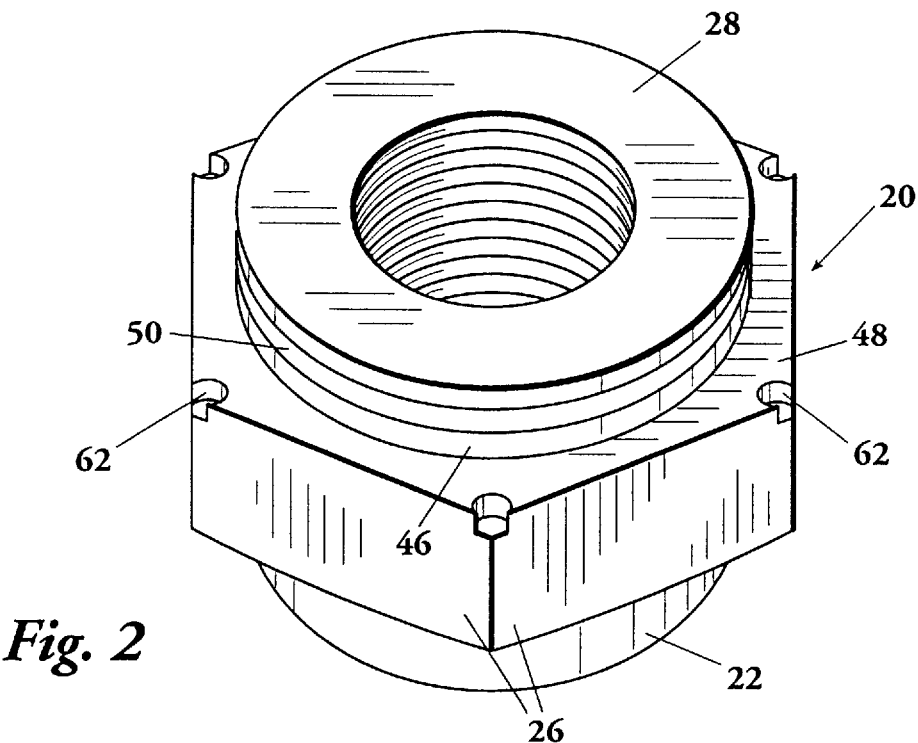
FIG. 2 is an isometric external view of a coupling base showing a preferred embodiment of the invention.
Figure 5:
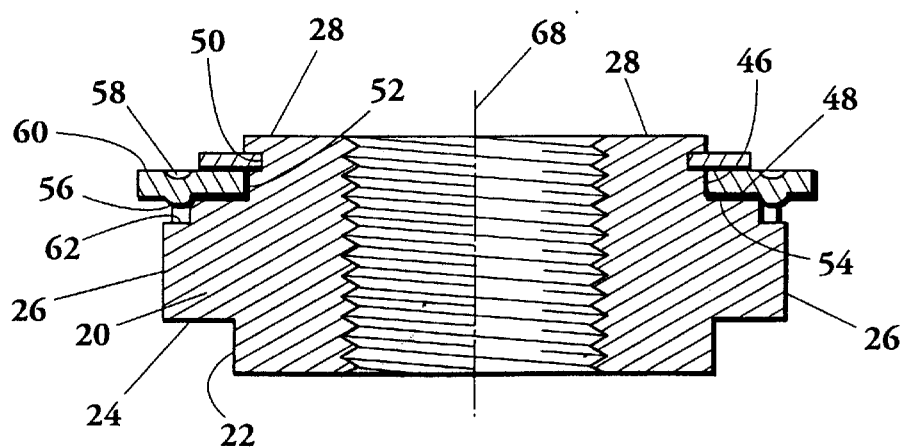
FIG. 5 is a cross-sectional view taken along the line 5—5 of FIG. 4.

As best seen in FIGS. 2 and 5, coupling base 20 has, at its upper end 28, an annular surface 46 as it connects with an upper shoulder surface 48. Spaced above annular surface 46 is a reduced diameter annular groove 50.

Figure 3:
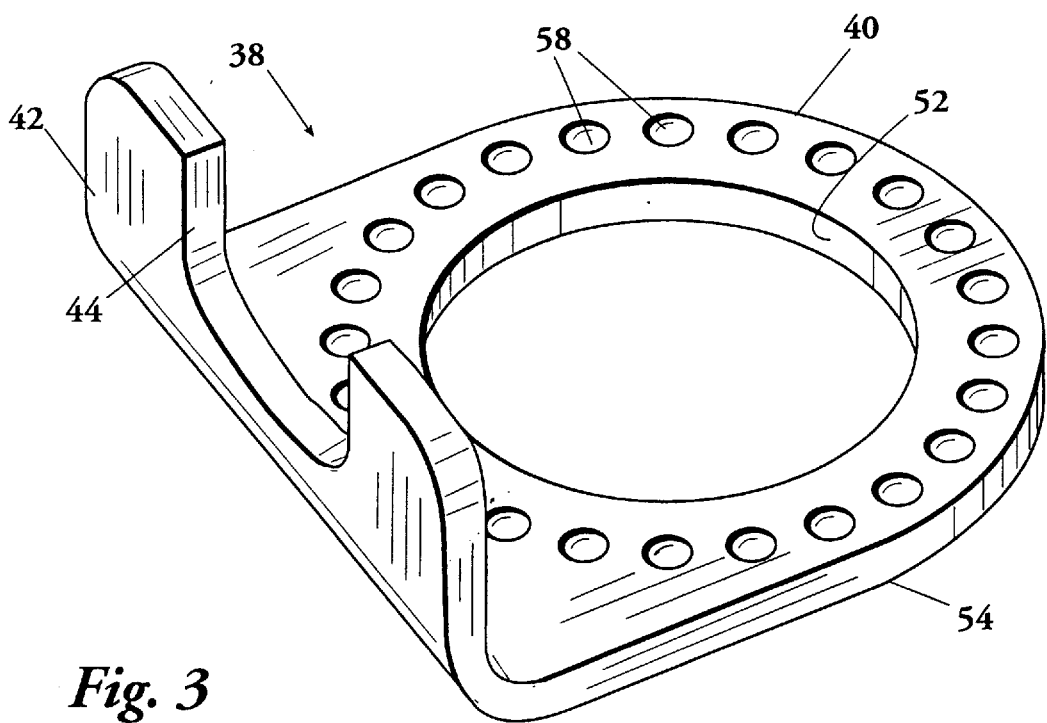
FIG. 3 is an isometric view of a bracket of the type as illustrated in FIG. 1 that is used to support a fuel line in a preselected orientation relative to the fuel filter.

As seen in FIG. 3, support bracket first portion 40 has an opening 52 therein that snugly receives coupling base annular surface 46, the lower surface 54 of bracket first portion 40 thereby rests on coupling base shoulder surface 48. Surrounding and spaced from opening 52 in bracket first portion 40 are a series of spaced apart protrusions 56. The protrusions are formed in bracket first portion lower surface 54 and seen best in FIG. 5. Protrusions 56 can most economically be formed by integral displacement of the material of which bracket 38 is made by forming indentations 58 in bracket first portion upper surface 60. This is particularly true when bracket 38 is formed of metal—the preferred embodiment of the invention. The easiest process of forming protrusions 56, and thereby indentations 58, is usually referred to as punching or staking.

As shown best in FIG. 2, coupling base 20 has indentations 62 at the apexes of wrench flats 26.

Figure 4:
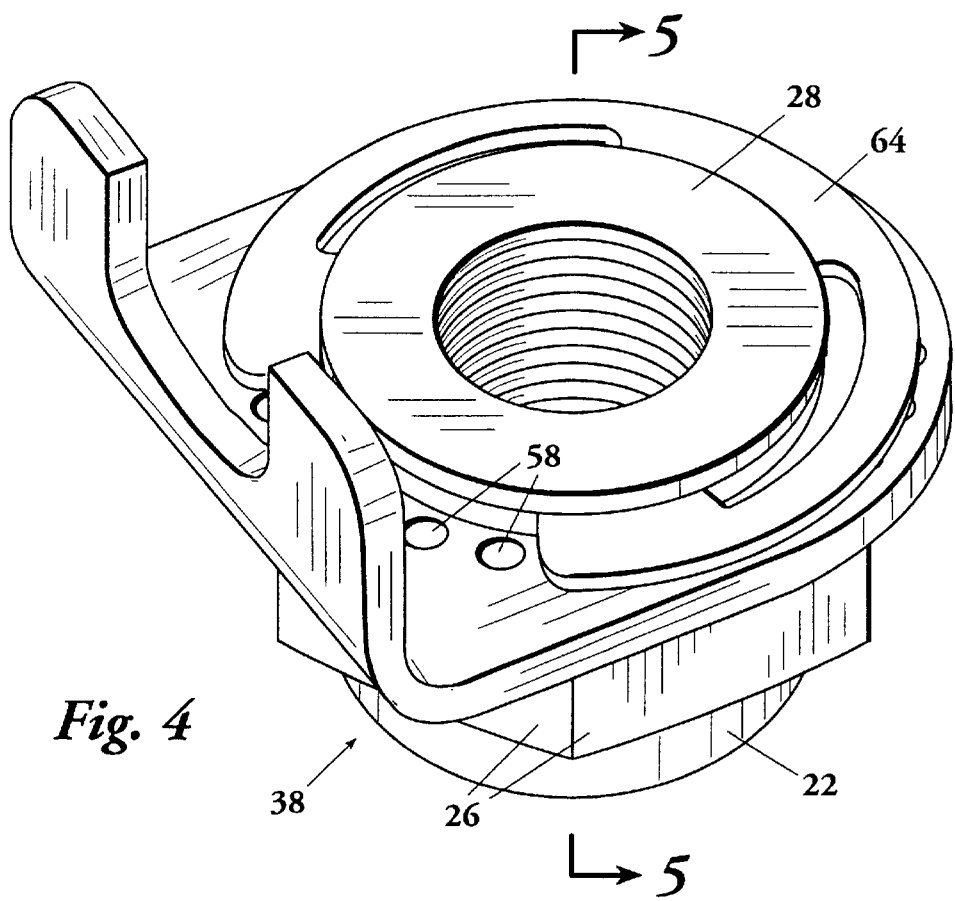
FIG. 4 is an external elevational view of the basic components making up the connection for attaching a fuel line to a fuel filter that is, (1) a coupling base, (2) a bracket having a U-shaped slot therein for receiving and supporting a fuel line, and (3) a retainer ring that is removably positioned in a groove in the coupling base, the retainer ring serving to maintain the bracket securely on the base and in axially oriented position relative to the coupling base.

When a filter 10 is installed a coupling base 20 is attached to at least one end of the filter. A bracket 38 is positioned loosely on coupling base 20 and rotated with respect to the coupling base so that the line receiving recess 44 is correctly oriented to receive a fuel line. The fuel line connection 30 is then positioned on coupling base 20 (as seen in FIG. 1) with the nipple portion 32 extending in slot 44. Bolt 36 is then tightened. Bracket 38 can be oriented with respect to the filter to attain the proper orientation of non-receiving recess 44 after which a key ring 64 (FIGS. 1 and 4) is inserted into groove 50. Key ring 64 serves to retain bracket first portion 40 in secure engagement with coupling base upper shoulder surface 48 by retaining protrusions 56 extending from the bracket within indentations 62. The interference between bracket protrusions 56 and indentations 62 securely rotatably locks support bracket 38 to coupling base 20 and thereby serves to securely support a fuel line connecting with the filter.

It can thus be seen that the invention herein is concerned only with the configuration of coupling base 20 and bracket 38 as the bracket is retained by key ring 64. The invention is not concerned with filter 10, fuel line connection 30, washer 34 or bolt 36 since these are standard items utilized in the industry. Stating it another way, the invention is concerned only with coupling base 20 and the configuration of bracket 38 as employed with standard fuel line connections and fuel filters as a means of rigidly retaining fuel lines connected to the filters in selected directional relationships. As an alternate embodiment of the invention (not illustrated), the indentations 62 formed in coupling base 20 may be eliminated and instead protrusions 56 extending downwardly from the lower surface 54 of bracket first portion 40 may be laid out in a pattern so that adjacent protrusions selectively extend to either side of the apexes formed by wrench flats 26 to thereby prevent the bracket from rotating relative to the coupling base.

As shown in FIG. 5, coupling base 20 has an axial passageway therethrough having an axis 68 that, when the coupling base is secured to a filter 10, is coaxial with the filter. The fuel line connection nipple portion 32 extends radially of axis 68.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A method of attaching a fuel line to a fuel filter comprising the steps of:

providing a tubular coupling base having a tubular axis and first and second ends spaced apart along said axis, affixing said first end to said filter, forming an intermediate portion with an external circumferential surface on said coupling base and defining said circumferential surface in part by wrench flats, connecting said second end with said fuel line, forming said an annular surface between said intermediate portion and said second end and forming a shoulder surface thereon extending perpendicularly to said axis, forming an annular reduced diameter groove between said annular surface and said second end;

forming a bracket of thin, stiff material having a first portion with opposed parallel first and second planar surfaces and a second portion extending perpendicularly to said first portion, providing a fuel line receiving recess in said second portion, forming a circular opening extending through said first and second planar surfaces for receiving said annular surface, engaging said first planar surface with said shoulder surface of said coupling base;

removably positioning a retaining ring in said groove of said coupling base to engage said second planar surface of said bracket to secure said bracket to said coupling base;

and providing means for providing interfering relationship between said first planar surface of said bracket and said shoulder surface of said coupling base when said retaining ring is in position in said groove of said coupling base.

2. The method of claim 1 including the further steps of providing protrusions on said first planar surface of said bracket, spacing said protrusions from said opening, and forming an interfering relation between said protrusions and said shoulder surface.

3. The method of claim 2 including the further step of forming at least one indentation in said shoulder surface for receiving at least one of said protrusions to provide said interfering relationship.

4. A method of attaching a fuel line to a fuel filter having a longitudinal axis wherein said fuel line is extendible away from said filter radially of said longitudinal axis, comprising the steps of:

providing a tubular coupling base having first and second ends and a tubular axis, affixing said first end to said filter so that said tubular axis is coincident with said filter longitudinal axis, forming an intermediate portion with an external circumferential surface on said coupling base and defining said circumferential surface in part by wrench flats, engaging said second end within a fluid fitting for connecting to said fuel line, providing said coupling base with an annular surface spaced between said second end and said intermediate portion and forming a radial shoulder surface thereon, forming an annular reduced diameter groove between said shoulder surface and said second end of said coupling base, forming an apex at each juncture of adjacent wrench flats and an indentation in said shoulder surface at each apex;

forming a support bracket of thin, stiff metal, forming an opening through a first portion in a first plane of said bracket to snugly receive said annular surface of said coupling base, forming an integral second portion in said bracket in a plane generally perpendicular to said first plane, providing a fuel line receiving recess in said second portion, forming protrusions in said first portion and spacing said protrusions around said opening, receiving at least some of said protrusions in at least some of said indentations on said coupling base;

and positioning a retaining ring in said groove of said coupling base to retain said first portion of said bracket in engagement within said shoulder surface and with at least some of said indentations of said coupling base.

* * * * *